Figure 1:
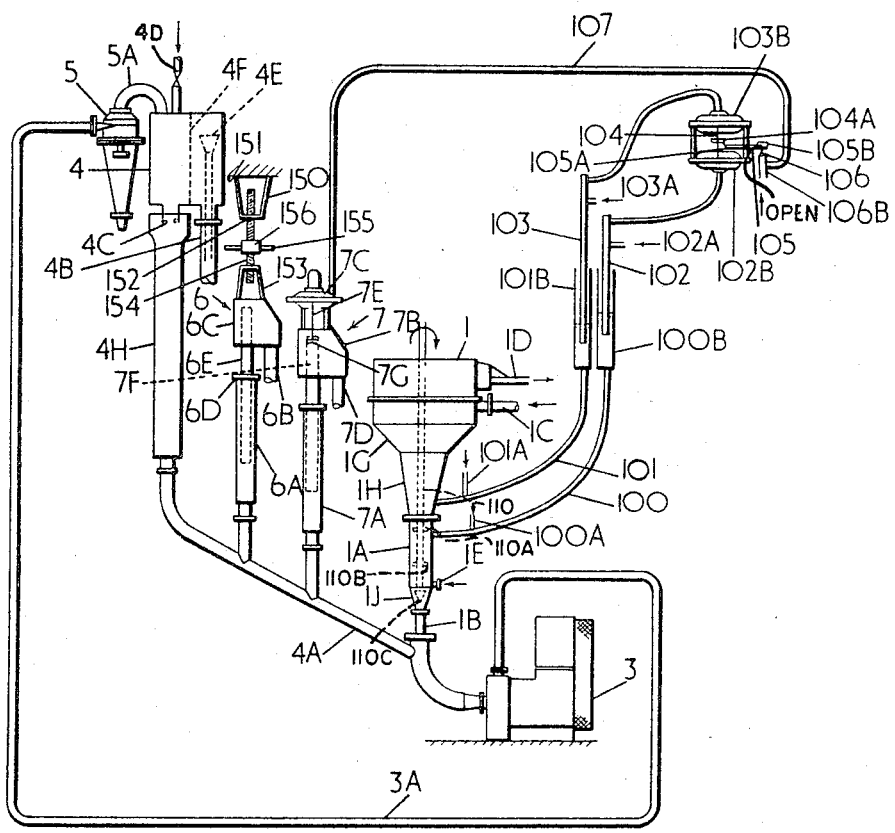

Oct. 25, 1966 A. A. HIRST 3,280,976
HYDRAULIC CLASSIFIER WITH UNDERFLOW DISCHARGE CONTROL
Filed April 9, 1963 2 Sheets-Sheet 1

Inventor
Arthur A. Hirst
By Stevens, Davis, Miller & Mosher
Attorneys

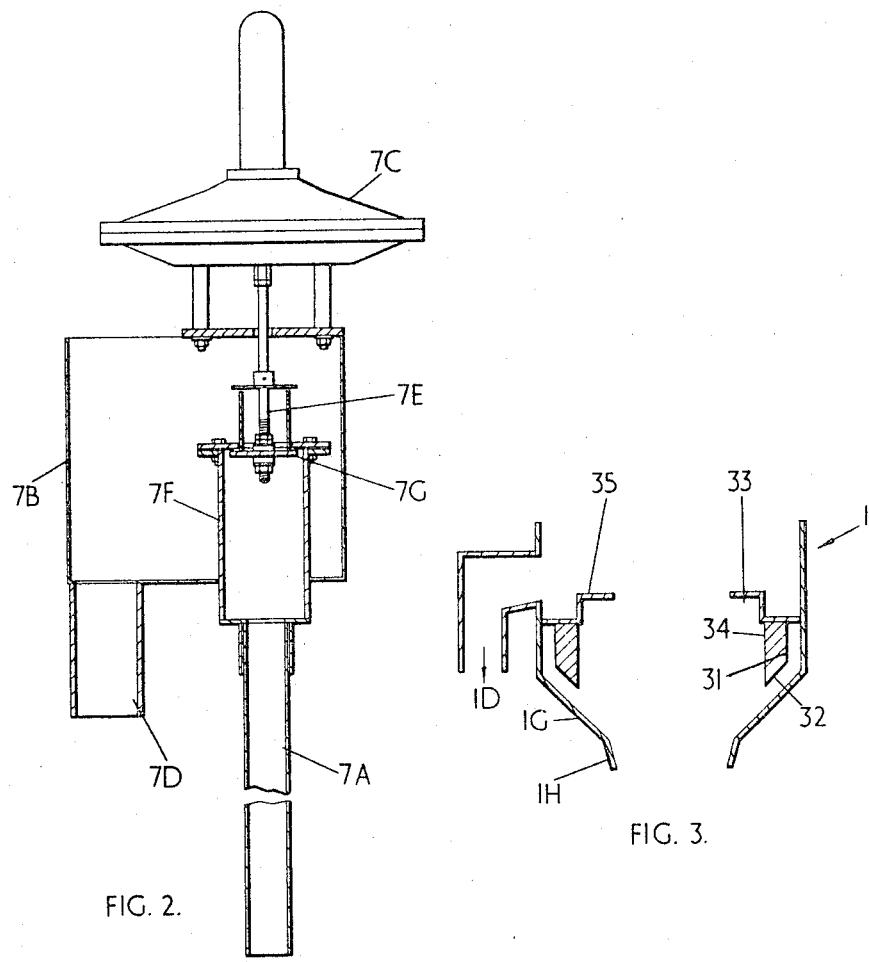

3,280,976
HYDRAULIC CLASSIFIER WITH UNDERFLOW
DISCHARGE CONTROL
Arthur A. Hirst, Ashby-de-la-Zouch, Leicestershire, England, assignor to Coal Industry (Patents) Limited, London, England, a company of Great Britain
Filed Apr. 9, 1963, Ser. No. 271,814
Claims priority, application Great Britain, Apr. 17, 1962, 14,855/62
6 Claims. (Cl. 209—158)

This invention relates to apparatus for the cleaning or separation of dirty coal or other mixed granular or particulate materials. The invention is envisaged as being of particular application and is described herewith with reference to the cleaning of coal, but it is to be understood that the invention may be applied to the separation of granular materials other than coal and its associated impurities or dirt and that, when so applied, the less dense granular material will be separated in a manner similar to the coal particles, and the more dense material in similar manner to the dirt particles.

In U.S. patent Serial No. 2,859,872 such an apparatus is described comprising a separating vessel with a conduit for admitting liquid at the bottom of the separating vessel, an overflow for liquid and solids, and a further conduit for admitting liquid at an intermediate level between the bottom of the separating vessel and the overflow, and means for feeding coal with or without liquid into the separating vessel at a level higher than the said intermediate level and means whereby, when the pressure head of the liquid admitted to the bottom of the separating vessel exceeds a predetermined value, some or all of this liquid is diverted and admitted to the separating vessel at the said intermediate level. The supply of part or the whole of the liquid to the separating vessel may be under a steady or a pulsating pressure. Conveniently the liquid used is water.

In operating such an apparatus for the purpose of cleaning fine coal, as for example, a coal washery slurry, it has been found that a factor limiting the throughput, or rate of input for efficient cleaning, may be the rate at which fine refuse can be evacuated from the bottom of the separating vessel.

It is therefore an object of the present invention to provide an improved apparatus for cleaning mixed particulate solid materials, and in particular an apparatus in which the permissible gravitational force available for evacuating refuse through the bottom of the separating vessel is increased, thereby increasing the permissible rate of evacuation of fine refuse and the rate at which coal may be efficiently washed.

According to the present invention, apparatus for separating mixed particulate solid materials of different densities comprising a separating vessel having an inlet chamber having a cylindrical wall with a downwardly-tapering lower portion; an inlet conduit arranged at an angle not greater than 25° to the tangent to the cylindrical wall for feeding solids and liquid into the inlet chamber; an overflow from said chamber located above said inlet conduit; an inner member located within said chamber and arranged co-axial with the wall of said chamber so that solids and liquid are caused to take a downward spiral path between said member and said wall; the vessel having immediately below said lower portion an outlet part terminating in an outlet orifice at its lower end, said orifice being adapted to discharge the more dense material from the vessel, the cross-sectional area of the outlet orifice being not greater than one-eighth of the cross-sectional area of the outlet part at its point of junction with the lower portion of the inlet chamber and the depth of the outlet part being at least equal to its diameter at said point of junction.

By "substantially tangential to the vessel wall" is meant that the inlet conduit is either tangential or at such an angle to the tangent that the admission of solids and liquid through the inlet conduit tends to promote a rotary motion of the solids and liquid within the separating vessel. Such an angle may for example be less than 25°.

Means for supplying liquid to and for regulating the pressure of the liquid supplied to the outlet orifice may be provided and may include by-pass means whereby when the hydrostatic pressure of the suspension of solids in the separating vessel exceeds a predetermined value the part of the liquid so supplied is by-passed so that such part is not admitted to the separating vessel either through the second conduit or at an intermediate level as in our prior U.S. patent Serial No. 2,859,872.

The separating vessel preferably has a downwardly-tapering cylindro-conical main part, immediately below which is located the outlet part. The outlet part may be parallel sided or may be tapering, or may have an upper part which is tapering and a lower part which is parallel sided, or conversely. Preferably, the main wall or walls of the outlet part make a smaller angle with the vertical than the curved wall of the cylindro-conical main part of the separating vessel.

The cross-sectional area of the outlet conduit at the lower end of the separating vessel and which constitutes also a second conduit for admitting liquid advantageously does not exceed ⅛ of the cross-sectional area of the vessel at the junction of the main part and the outlet section. In a preferred form the former cross-sectional area does not exceed ⅙ of the latter cross-sectional area.

One or more further conduits may be provided for admitting liquid at an intermediate level between the bottom of the separating vessel and the inlet for feeding solids and liquid into the separating vessel. Preferably such further conduit or conduits enter the separating vessel tangentially and through ports in the wall of the outlet section. Preferably means are provided to agitate or stir the liquid and fine solids in the outlet part of the separating vessel.

Means for controlling the quantity of liquid supplied to the second conduit may conveniently comprise a header tank continuously supplied wtih liquid: the head of liquid may be varied by altering the level at which the liquid in this tank overflows. Alternatively, or in addition, flow control means such as a regulating valve or orifice may be provided for adjusting the quantity of liquid supplied to the second conduit.

The pressure of the liquid entering the bottom of the separating vessel is adjusted by a pressure control device operating separately and independently of the means provided for controlling the quantity of liquid supplied to the second conduit. The pressure control device may comprise a liquid by-pass circuit connected to the second conduit with overflow means whose height, relatively to the separating vessel, may be varied either manually, or automatically in response to a variation in the depth or density of the bed of refuse and liquid in the separating vessel.

In one arrangement, the second conduit is connected to two pressure control devices each comprising a liquid by-pass circuit with overflow means at different levels with respect to the separating vessel. The overflow of liquid through the overflow means at the lower level is controlled by a restrictor device and orifice control means which prevent the overflow of the liquid when the depth or density of the mixture of fine refuse and liquid in the outlet section of the separating vessel does not exceed a predetermined value and which is automatically opened to permit the overflow of liquid when the depth or density of the mixture of fine refuse and liquid in the outlet section of the separating vessel is equal to or greater than the said predetermined value.

In a further form of the invention a single pressure control device is provided comprisng a liquid by-pass circuit with overflow means whose height with respect to the bottom of the separating vessel may be varied automatically in accordance with the depth or density of the mixture of fine refuse and liquid in the outlet section of the separating vessel.

In the instance where the restrictor device and orifice control means are responsive to the depth of the fine refuse-liquid mixture, then they may be conveniently made responsive to the hydrostatic pressure at or near the bottom of the vessel; in the instance where they are responsive to the density of the mixture of liquid and fine refuse in the outlet part of the vessel then they may conveniently be made responsive to the difference in pressure at two vertically-spaced levels in the vessel; as an alternative to the latter when refuse is being separated from fine coal, the density at a convenient zone in the outlet part may be monitored by a radiation instrument such as a $\gamma$-ray or X-ray absorption or back-scattering whose output signal is related to the density of the liquid-refuse mixture.

In the accompanying drawings the invention is illustrated by way of example;

FIGURE 1 being a diagrammatic representation of an apparatus according to the invention, FIGURE 2 diagrammatic side elevation of a portion of the apparatus shown in FIGURE 1 on a larger scale, and FIGURE 3 is a diagrammatic cross-section of one construction of the upper portion of the separating vessel.

Referring to FIGURE 1, the arrangements for admitting the feed of fine coal and water are similar to those described in our U.S. patent Serial No. 2,859,872, the feed entering the separating vessel 1 tangentially at 1C, where it is caused to take a downward spiral path between an inner member 31 (FIGURE 3) and the cylindro-conical outer wall 1G of the inlet chamber or main part of the separating vessel. A preferred included angle for the conical section 1G of the inlet chamber is approximately 90°. The conical upper portion of an outlet part 1H of the vessel is connected to the base of the inlet chamber 1G. The diameter of the base of the conical section 1G is preferably at least three times the diameter of the outlet conduit constituted by spigot tube 1B through which refuse is evacuated from the separating vessel. The outlet part has a lower tapering portion 1J.

FIGURE 3 shows one construction of the main or upper part of the separating vessel, like reference numerals indicating like parts in FIGURES 1 and 3. In the construction shown in FIGURE 3 the feed enters tangentially as in FIGURE 1 and passes down between the outer wall 1G of the inlet chamber and a cylindrical inner wall 31, then between the frusto-conical portion of the outer wall 1G and a frusto-conical inner wall 32. The upper chamber 33 is formed by a cylindrical wall 34, which bears at its upper end an inwardly-directed flange ring 35.

Reverting now to FIGURE 1, the spigot tube 1B is connected to a tailings pump 3 and to a pipe 4A to which washery water is admitted from tank 4.

This constant level tank 4 is supplied with water from a pipe 4D and feeds to the pipe 4A at a controlled rate through an orifice 4C which is adjustable in size. The water thence passes to the second conduit constituted by tube 1B. The quantity or rate of supply of such washery water is further controlled by varying the vertical position of the overflow 4E. From the overflow 4E the water passes via pipe 4B to a washery sump (not shown). A perforated plate 4F serves to minimise surging in the tank 4. The washery water flowing through the orifice 4C is admitted to the pipe 4A via a funnel.

Tangential pipe 1E supplies a relatively small flow of water at medium pressure to the outlet part 1A of the separating vessel 1.

The pressure of the washing water supplied to the separating vessel through the pipe 4A is separately and independently controlled by a first means generally designated 6 and a second means generally designated 7. The first of these comprises a by-pass circuit including a vertical pipe 6A leading from the pipe 4A through a gland 6D and a pipe 6E into tank 6C which empties through pipe 6B, e.g. to a washery sump (not shown). The pipe 6E and tank 6C may be moved vertically as a whole to alter the hydrostatic head with respect to that in the separating vessel 1, and when the pressure of the refuse (shale) suspension exceeds the pressure head in pipes 6A and 6B, water is diverted from entering the separating vessel through 4A and overflows into tank 6C.

The tank 6C may be vertically adjusted by means depicted in FIGURE 1. Such means comprise a shackle 150 secured to a fixed support 151 and having a threaded hole 152. A similar shackle 153 is fixed to the tank 6C. A contra-threaded rod 154 has one end threaded into the hole in each of these shackles and can be rotated by a tommy-bar 155 or the like passing through a transverse hole in the central portion 156 of the rod 154. Such rotation acts to either lift or lower the tank 6C.

The second means generally designated 7 comprises a by-pass circuit including pipe 7A, tank 7B and pipe 7D. As can be seen in FIGURE 2, the pipe 7A leads into a chamber 7F located largely within the tank 7B and having an orifice at its upper end closed or restricted by a plate 7G. The plate 7G is attached to a stem 7E which is connected to a diaphragm motor 7C, the plate being normally held in the closed position by a spring and opened by movement of the diaphragm which is actuated in response to variations in the depth or density of the bed of shale in the separating vessel.

In operation the restrictor device (i.e., movable plate 7G) controlling the by-pass of water may be manually or automatically operated as described hereinafter. The two by-pass circuits constituting pressure controllers for liquid entering the vessel through the second conduit, i.e., pipe 4A, are set so that the overflows in tanks 6 and 7 are at different heights, the overflow in tank 7 being lower than that in tank 6. It is found that under conditions when refuse is supplied to the separating vessel at low rates, and particularly when commencing to wash or when the feed of raw coal ceases, it is desirable to increase the pressure in pipe 4A. Conversely, when refuse is present in the feed in a high proportion, it is desirable to decrease the pressure in pipe 4A. When manual control for one of the by-pass chambers is provided such control may be used at the discretion of the washery operator. Alternatively, when automatic operation is required, the shut-off or restrictor for the bypass is operated automatically in response to variations in the depth or density of the bed of refuse or shale in the separating vessel. Means responsive to hydrostatic pressure or density are connected to the outlet section of the separating vessel so that an increase in the depth or density of the bed of shale above a pre-determined limit causes the restrictor 7G in the secondary automatic control device to open. In the construction shown in FIGURE 1 such means are responsive to a difference in hydrostatic pressure and include two pipes 100 and 101 connected to the outlet part of the separating vessel at different and vertically spaced levels. Small quantities of water are admitted to the pipes 100 and 101 through connections 100A and 101A and the upper ends of the pipes are connected to vessels 100B and 101B. Dip tubes 102 and 103, preferably adjustable in height are arranged so that the lower ends of the tubes are normally below the level of the water in vessels 100B and 101B. Small quantities of air under pressure are admitted to the dip tubes 102 and 103 through the connections 102A and 103A. The dip tubes 102 and 103 are further connected to the diaphragm motors 102B and 103B which when subjected to air pressure tend to move the diaphragm plates in opposite directions, that is, towards one another. The two diaphragm plates are connected by a rod 104 to which is radially attached a disc 104A. A pivoted arm 105 is arranged so that when the diaphragm motors are in the position shown in FIGURE 1 one end 105A of the arm is depressed by the disc 104A and the pad 105B at the opposite end of the pivoted arm 105 is raised away from the nozzle 106. When the disc 104A rises the end 105A of the arm 105 also rises and the pad 105B falls to close the orifice 106. Variations in the density of the mixture of refuse and water in the outlet part of the separating vessel give rise to corresponding variations in the levels of the water in vessels 100B and 101B: an increase in density resulting in a rise of the water level in vessel 100B with respect to that in 101B and vice versa. Such variations in the liquid levels in vessels 100B and 101B cause corresponding variations in the air pressure in the dip pipes 102 and 103 which are transmitted to the diaphragm motors 102B and 103B. The heights of the dip pipes 102 and 103 are adjusted so that the air pressure in the diaphragm motor 102B exceeds that in 103B by an amount sufficient to cause the disc 104A to rise when the density of the mixture of refuse and liquid in the outlet section of the separating vessel attains a value when it becomes desirable to reduce the pressure of the water supplied to the bottom of the separating vessel. A small quantity of air under pressure is fed to the pipe 106B connected to the nozzle 106; and the pipe 106B is further connected to the air line 107 which is itself connected to the diaphragm motor 7C. This motor 7C is normally held in the position where the plate 7G closes the orifice by a spring. When the nozzle 106 is open, air supplied through the pipe 106B escapes freely through the nozzle and the diaphragm motor remains in the closed position. When the disc 104A is caused to rise, the pad 105B restricts the escape of air through the nozzle 106 thereby pressurising the diaphragm motor 7C causing the pressure plate to move against the action of the spring so permitting the overflow of water in the pressure control device 7.

The remainder of the circuit shown in FIGURE 1 will now be described. The spigot tube 1B is connected to the tailings pump 3 and thence via pipe 3A to a tailings cyclone 5. The refuse, or tailings, are discharged through the apex of the cyclone 5. The top product (water) from the cyclone 5 passes through a pipe 5A to the constant level tank 4. The pump 3 may be of the centrifugal type.

In operation the quantity of washery water supplied to the funnel 4H and thence along pipe 4A is adjusted, by a choice of a suitable orifice 4C and the setting of the adjustable overflow 4E, so that the said quantity is sufficient to supply the needs of the pump 3 and, in addition, to be sufficient, when flowing upwards through the spigot tube 1B, to prevent any substantial downward flow of refuse through the spigot tube.

The coal and refuse entering the separating vessel together with the transporting water tends to separate, with the refuse beneath the coal. The refuse, particularly the finer gritty refuse, forms a relatively dense suspension in the outlet part 1A and the pipe 1B. Such refuse, apart perhaps from relatively coarse material, is prevented from sinking through the spigot tube 1B unless the hydrostatic head of the refuse suspension is sufficient to neutralise or substantially to neutralise the pressure of the washery water in the pipe 4A so that the upward flow of water through the spigot tube ceases or is substantially weakened.

The maximum area of the spigot tube 1B is preferably such that an upward current through the spigot tube sufficient to prevent the discharge of fine refuse should produce conditions known as "teeter" conditions in the outlet part. To obtain this preferred condition, the cross-sectional area of the spigot tube 1B should be substantially smaller than the maximum cross-sectional area of the outlet part, preferably not exceeding ⅛ of this area.

The vessel has an axially arranged stirrer comprising a rotating shaft 110, driven by means which are not illustrated, and stirring elements 110A, 110B and 110C operating in the outlet part of the separating vessel. The stirrer which may, for example, rotate at 50 revolutions per minute, revolves in the same direction as the rotation induced by the tangential entry of the feed of solids and liquid to the separating vessel. The agitation produced by the stirrer assists the promotion of the required fluid suspension of fine solids and liquid in the outlet part referred to above.

In an alternative embodiment of the invention, not illustrated, the pipe 101 and its associated equipment 101A, 101B, 103, 103A, 103B are not used. In this embodiment of the invention, the diaphragm motor 7C, instead of responding to the differential pressure in the separating vessel between the levels at which pipes 100 and 101 are connected to the vessel, responds solely to the hydrostatic pressure in the separating vessel at the level of the connection to pipe 100. In this further form of the invention the rod 104 and the disc 104A are attached only to the diaphragm motor 102B and the diaphragm motor 7C is actuated in response solely to variations in the water level in the vessel 100B.

It is to be understood that any other known means, responsive to hydrostatic pressure or density, may be connected to the separating vessel to actuate and control the automatic operation of the by-pass means connected to the pipe 4A. It is further to be understood that, instead of providing two by-pass means one of which is automatically opened, it is envisaged that a single pressure control device including means responsive to variations in the depth or density of the mixture of solids and liquid in the separating vessel could be arranged to vary the level of the overflow of liquid from such single by-pass means connected to the pipe 4A.

In the forms of the present invention described above the refuse ejected through the spigot tube 1B of the separating vessel is evacuated from the apparatus, together with transporting water, by a tailings pump 3 and a cyclone 5. It is to be understood that the invention is not confined to this method of evacuating the separated refuse and that instead, for example, a bucket elevator or scraper conveyor with a water-tight casing could alternatively be used. It is also to be understood that the tailings pump 3 can be omitted by arranging the cyclone 5 at a level sufficiently low for it to be connected directly to an extension of the pipe 4A.

We claim:
1. Apparatus for separating mixed particulate solid materials of different densities comprising;
a separating vessel having an inlet chamber having a cylindrical wall with a downwardly tapering lower portion;
an inlet conduit arranged at an angle not greater than 25° to the tangent to the cylindrical wall for feeding solids and liquid into the inlet chamber;
an overflow from said chamber located above said inlet conduit;
an inner member located within said chamber and arranged coaxial with the wall of said chamber so that the solids and liquid entering the vessel are caused to take a downward spiral path between said member and said wall;
an outlet part of the vessel terminating in an outlet orifice at its lower end and located immediately below said lower portion, said orifice being adapted to discharge the relatively denser material from the vessel, the cross-sectional area of the outlet orifice being not greater than one-eighth of the cross-sectional area of the outlet part at its point of junction with the lower portion of the inlet chamber and the depth of the outlet part being at least equal to its diameter at said point of junction;

first and second means for supplying liquid at regulated pressure to said outlet orifice arranged in parallel manner, each said liquid supply means having a rising liquid supply pipe;

by-pass means associated with each said liquid supply means, communicating with said supply pipe and vertically spaced from the outlet orifice, the by-pass means of the second liquid supply means being at a lower level than said first by-pass means, and the by-pass means of the first liquid supply means having an overflow which by-passes liquid upon the hydrostatic head at the outlet orifice exceeding the height of the overflow;

and a restrictor device provided on said second by-pass means and adapted to regulate the operation of said second by-pass means in response to the density of separated relatively denser material in the separating vessel.

2. Apparatus according to claim 1 wherein said restrictor device is adapted to adjust the size of the overflow orifice of the second rising liquid supply pipe.

3. Apparatus according to claim 2 comprising means for adjusting the size of the orifice of the second rising liquid supply pipe in response to variations in the depth and density of the relatively denser material in the outlet part of the separating vessel.

4. Apparatus according to claim 1 comprising a diaphragm responsive to a pressure dependent on the depth of the bed of relatively denser material in the outlet part of the separating vessel, said diaphragm being arranged to actuate the restrictor device.

5. Apparatus according to claim 4 wherein the diaphragm is connected on the one hand to a dip pipe communicating with the lower part of the separating vessel and on the other hand with a membrane regulator.

6. Apparatus according to claim 1 wherein the first liquid supply means comprises pressure regulating means including a liquid supply tank with an inlet pipe terminating inside the tank, an outlet and overflow pipe and a level adjusting device for adjusting the overflow level of the tank.

References Cited by the Examiner
UNITED STATES PATENTS

| | | | |
|---|---|---|---|
| 2,377,524 | 6/1945 | Samson | 209—211 |
| 2,715,463 | 8/1955 | Fitch | 209—159 |
| 2,754,963 | 7/1956 | Krijgman | 209—172.5 X |
| 2,793,748 | 5/1957 | Herkenhoff | 209—172.5 X |
| 2,859,872 | 11/1958 | Hirst | 209—158 |
| 2,877,896 | 3/1959 | Jones | 209—172.5 |
| 3,093,577 | 6/1963 | Wilmot | 209—172.5 |

FRANK W. LUTTER, *Primary Examiner.*